(12) United States Patent
Yoshida

(10) Patent No.: US 7,251,053 B1
(45) Date of Patent: Jul. 31, 2007

(54) IMAGE PROCESSING APPARATUS AND METHOD

(75) Inventor: Hiroki Yoshida, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 1187 days.

(21) Appl. No.: 09/630,572

(22) Filed: Aug. 3, 2000

(30) Foreign Application Priority Data

Aug. 13, 1999 (JP) ................... 11-229181

(51) Int. Cl.
*G06F 15/00* (2006.01)
*G06K 15/00* (2006.01)
*G06K 9/40* (2006.01)
*G06K 9/48* (2006.01)

(52) U.S. Cl. .................. 358/1.9; 358/2.1; 358/3.27; 382/266; 382/199

(58) Field of Classification Search .............. 358/1.9, 358/3.15, 3.27, 535, 448, 2.1; 382/167, 266, 382/254, 199, 256, 269
See application file for complete search history.

(56) References Cited

U.S. PATENT DOCUMENTS

| | | | | | |
|---|---|---|---|---|---|
| 5,271,064 | A | * | 12/1993 | Dhawan et al. | 382/266 |
| 5,392,365 | A | * | 2/1995 | Steinkirchner | 382/260 |
| 5,485,534 | A | * | 1/1996 | Takemoto et al. | 382/263 |
| 5,488,673 | A | * | 1/1996 | Katayama et al. | 382/270 |
| 5,719,958 | A | * | 2/1998 | Wober et al. | 382/199 |
| 5,825,937 | A | * | 10/1998 | Ohuchi et al. | 382/261 |
| 5,886,797 | A | * | 3/1999 | Shimura | 382/266 |
| 6,055,340 | A | * | 4/2000 | Nagao | 382/261 |
| 6,227,725 | B1 | * | 5/2001 | Ancin et al. | 358/1.9 |
| 6,233,062 | B1 | * | 5/2001 | Takamatsu et al. | 358/463 |
| 6,388,706 | B1 | * | 5/2002 | Takizawa et al. | 348/273 |
| 6,392,759 | B1 | * | 5/2002 | Kuwata et al. | 358/1.9 |
| 6,438,270 | B1 | * | 8/2002 | Harrington | 382/262 |
| 6,628,842 | B1 | * | 9/2003 | Nagao | 382/266 |
| 6,642,962 | B1 | * | 11/2003 | Lin et al. | 348/252 |
| 6,697,537 | B2 | * | 2/2004 | Norimatsu | 382/275 |
| 6,721,457 | B1 | * | 4/2004 | Atkins et al. | 382/260 |

FOREIGN PATENT DOCUMENTS

| | | |
|---|---|---|
| EP | 0 883 086 | 12/1998 |
| JP | 5-108823 | 4/1993 |
| JP | 9-114974 | 5/1997 |
| JP | 10-143673 | 5/1998 |
| JP | 10-257329 | 9/1998 |

* cited by examiner

*Primary Examiner*—Kimberly Williams
*Assistant Examiner*—Charlotte M. Baker
(74) *Attorney, Agent, or Firm*—McDermott Will & Emery LLP

(57) ABSTRACT

The sharpness of a digital image is enhanced by an edge enhancement process in which the edge adjustment range is adjusted. The image processing apparatus of the present invention determines the edge enhancement range by calculation using a weighting matrix. Specifically, data of a target pixel and the surrounding pixels are calculated using a weighting matrix selected by a weighting selection means, and the edge enhancement range is determined by comparing this calculated value to a specific threshold value. The data of pixels within the enhancement range are then subjected to the edge enhancement process.

10 Claims, 8 Drawing Sheets

|     |     |     |
| --- | --- | --- |
| 1,1 | 1,2 | 1,3 |
| 2,1 | 2,2 | 2,3 |
| 3,1 | 3,2 | 3,3 |

FIG.4

|     |     |     |
| --- | --- | --- |
| ,P  | 2   | 1   |
| -1  | -2  | -1  |
| 0   | 0   | 0   |

FIG.5A

|     |     |     |
| --- | --- | --- |
| 0   | 0   | 0   |
| ,P  | 2   | 1   |
| -1  | -2  | -1  |

FIG.5B

|     |     |     |
| --- | --- | --- |
| 1   | -1  | 0   |
| 2   | -2  | 0   |
| 1   | -1  | 0   |

FIG.5C

|     |     |     |
| --- | --- | --- |
| 0   | 1   | -1  |
| 0   | 2   | -2  |
| 0   | 1   | -1  |

FIG.5D

| 1,1 | 1,2 | 1,3 | 1,4 | 1,5 |
|---|---|---|---|---|
| 2,1 | 2,2 | 2,3 | 2,4 | 2,5 |
| 3,1 | 3,2 | 3,3 | 3,4 | 3,5 |
| 4,1 | 4,2 | 4,3 | 4,4 | 4,5 |
| 5,1 | 5,2 | 5,3 | 5,4 | 5,5 |

FIG.11

| 0 | 0 | $a_{13}$ | $a_{14}$ | $a_{15}$ |
|---|---|---|---|---|
| 0 | 0 | $a_{23}$ | $a_{24}$ | $a_{25}$ |
| 0 | 0 | $a_{33}$ | $a_{34}$ | $a_{35}$ |
| 0 | 0 | $a_{43}$ | $a_{44}$ | $a_{45}$ |
| 0 | 0 | $a_{53}$ | $a_{54}$ | $a_{55}$ |

FIG.12A

| $a_{11}$ | $a_{12}$ | $a_{13}$ | $a_{14}$ | $a_{15}$ |
|---|---|---|---|---|
| 0 | $a_{22}$ | $a_{23}$ | $a_{24}$ | $a_{25}$ |
| 0 | 0 | $a_{33}$ | $a_{34}$ | $a_{35}$ |
| 0 | 0 | 0 | $a_{44}$ | $a_{45}$ |
| 0 | 0 | 0 | 0 | $a_{55}$ |

FIG.12B

| $a_{11}$ | $a_{12}$ | $a_{13}$ | $a_{14}$ | $a_{15}$ |
|---|---|---|---|---|
| 0 | $a_{22}$ | $a_{23}$ | $a_{24}$ | 0 |
| 0 | 0 | $a_{33}$ | 0 | 0 |
| 0 | 0 | 0 | 0 | 0 |
| 0 | 0 | 0 | 0 | 0 |

FIG.12C

| 0 | $a_{12}$ | $a_{13}$ | $a_{14}$ | 0 |
|---|---|---|---|---|
| 0 | $a_{22}$ | $a_{23}$ | $a_{24}$ | 0 |
| 0 | $a_{32}$ | $a_{33}$ | $a_{34}$ | 0 |
| 0 | $a_{42}$ | $a_{43}$ | $a_{44}$ | 0 |
| 0 | $a_{52}$ | $a_{53}$ | $a_{54}$ | 0 |

FIG.12D

| -1 | -1 | -1 |
|----|----|----|
| -1 | 8  | -1 |
| -1 | -1 | -1 |

FIG.13 ly the calculation result of the calculating means to a specific
IMAGE PROCESSING APPARATUS AND METHOD The present application claims priority to Japanese Patent Application No. 11-229181 filed Aug. 13, 1999, the entire content of which is hereby incorporated by reference.

BACKGROUND OF THE INVENTION

1. Field of the Invention

The present invention relates to a digital image edge enhancement process.

2. Description of the Related Art

Digital images input from a digital camera and the like are subjected to various types of image correction. Various methods are used in the edge enhancement process, which is one of these image correction processes. For example, the edge is determined to be between pixels in the image process disclosed in Japanese Laid-Open Patent No. 5-108823. Furthermore, a threshold value which determines the edge is automatically calculated in the image process disclosed in Japanese Laid-Open Patent 10-143673.

Generally, when enhancing the sharpness of a digital image by an edge enhancement process, it is desirable to adjust the thickness of the edge, i.e., the range of edge enhancement, in accordance with the characteristics of the photographic object. For example, when photographing a building or man-made object, the image appears to have an added border when the line of the contour of the building is thickened, such that the image appears unnatural. Accordingly, it is desirable to enhance the line by narrowing the edge enhancement range so as to not thicken the line in the case of buildings and the like. Conversely, when enhancing an edge by thinning the edge in the case of a human image and the like, the enhancement often produces the opposite effect of making the eyes and the like appear unnatural. For this reason it is desirable to smoothly enhance the edge by broadening the width of the edge in the case of human images. That is, when photographing people, the enhancement range must be somewhat broadened with moderate edge enhancement. Numerous methods of automatic edge enhancement have been proposed heretofore, but the enhancement range must be input manually.

SUMMARY OF THE INVENTION

An object of the present invention is to provide an image processing apparatus capable of automatically accomplishing suitable edge enhancement.

Another object of the present invention is to provide an image processing apparatus capable of excellent edge enhancement for human images as well as image of man-made objects.

These and other objects are attained by an image processing apparatus, comprising edge detecting means for determining the presence/absence of an edge at each pixel of input image data; selecting means for selecting a weighting matrix corresponding to the position of the edge of each target pixel determined to have an edge by the edge detecting means; calculating means for calculating data of the target pixel and the pixels surrounding the target pixel using the weighting matrix selected by the selecting means; enhancement range determining means for determining the range of edge enhancement of the target pixel by comparing the calculation result of the calculating means to a specific threshold value; and edge enhancing means for executing an edge enhancement process on data of object pixels within the enhancement range determined by the enhancement range determining means.

The present invention is a medium readable by a computer storing computer-executable programs comprising the steps of determining the presence/absence of an edge at each pixel of input image data; selecting a weighting matrix corresponding to the position of the edge for each target pixel determined to have an edge; calculating data of the target pixel and pixels surrounding the target pixel using selected weighting matrix; comparing the calculation result to a specific threshold value; determining the range of edge enhancement for the target pixel based on the comparison result; and executing an edge enhancement process for the object pixels within the determined enhancement range.

It is desirable that the enhancement range determining means increases the weighting of components corresponding to the interior side of the edge in the weighting matrix.

It is further desirable that the enhancement range determining means selects a weighting matrix based on the presence/absence of an edge in four directions surrounding the target pixel.

It is further desirable that the edge enhancing means executes processing based on the hue and chroma of the pixels surrounding the object pixel.

It is even further desirable that the edge enhancing means executes processing based on the distance of the object pixel to the target pixel.

The invention itself, together with further objects and attendant advantages, will be best understood by reference to the following detailed description taken in conjunction with the accompanying drawings.

BRIEF DESCRIPTION OF THE DRAWINGS

FIG. 4 shows the coordinates within a block of 3×3 pixels;
FIGS. 5A through 5D show the edge detection matrices;
FIG. 11 shows the coordinates within a block of 5×5 pixels;
FIGS. 12A through 12D show examples of weighting matrices;
and
FIG. 13 shows an edge enhancement matrix.

In the following description, like parts are designated by like reference numbers throughout the several drawings.

DETAILED DESCRIPTION OF THE PREFERRED EMBODIMENTS

The embodiments of the present invention are described hereinafter with reference to the accompanying drawings.

Figure 1:
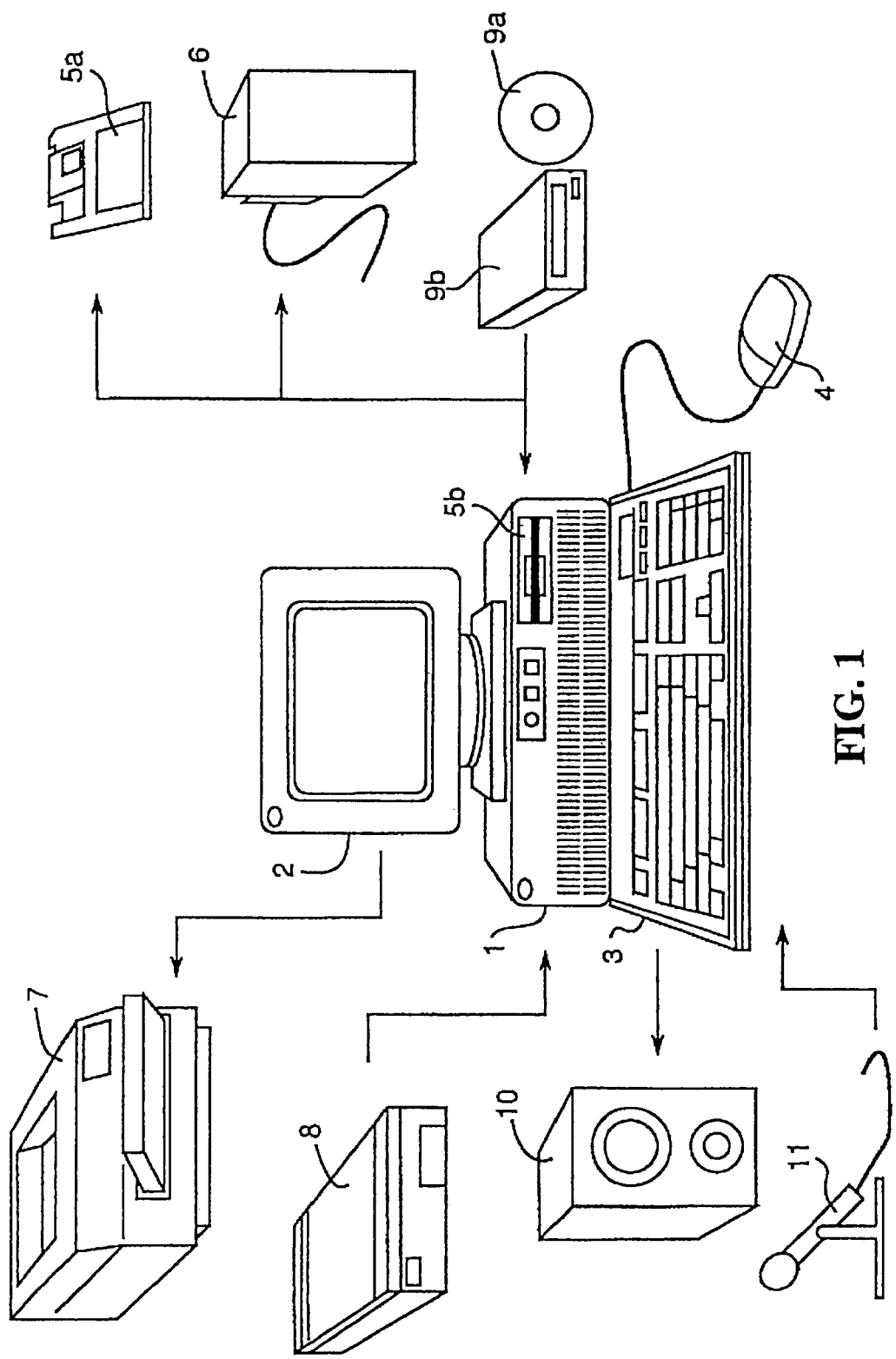
FIG. 1 shows the overall construction of an image processing apparatus.

The image processing apparatus of the present embodiment of the invention has a controller 1 at it's center for controlling the overall image processing apparatus provided with a CPU. In FIG. 1, the arrows represent the flow of data. A display 2 displays images or text and the like, and displays various types of screens for operation. A keyboard 3 and mouse 4 are used for various input and specified operations.

A floppy disk 5 and hard drive 6 are data storage media for storing and saving image data, and the image processing apparatus is provided with a floppy disk drive and a hard disk drive for accessing the floppy disk 5 and the hard disk 6. A printer 7 prints the image data and the like on paper. A scanner 8 reads image data from a document. A CD-ROM 9 is a storage medium for storing large amounts of various types of image data, and the image processing apparatus is provided with a CD-ROM drive to access the CD-ROM 9. A speaker 10 for audio output and a microphone 11 for audio input are connected. An image processing program described later is read from an external storage medium such as the CD-ROM.

Figure 2:
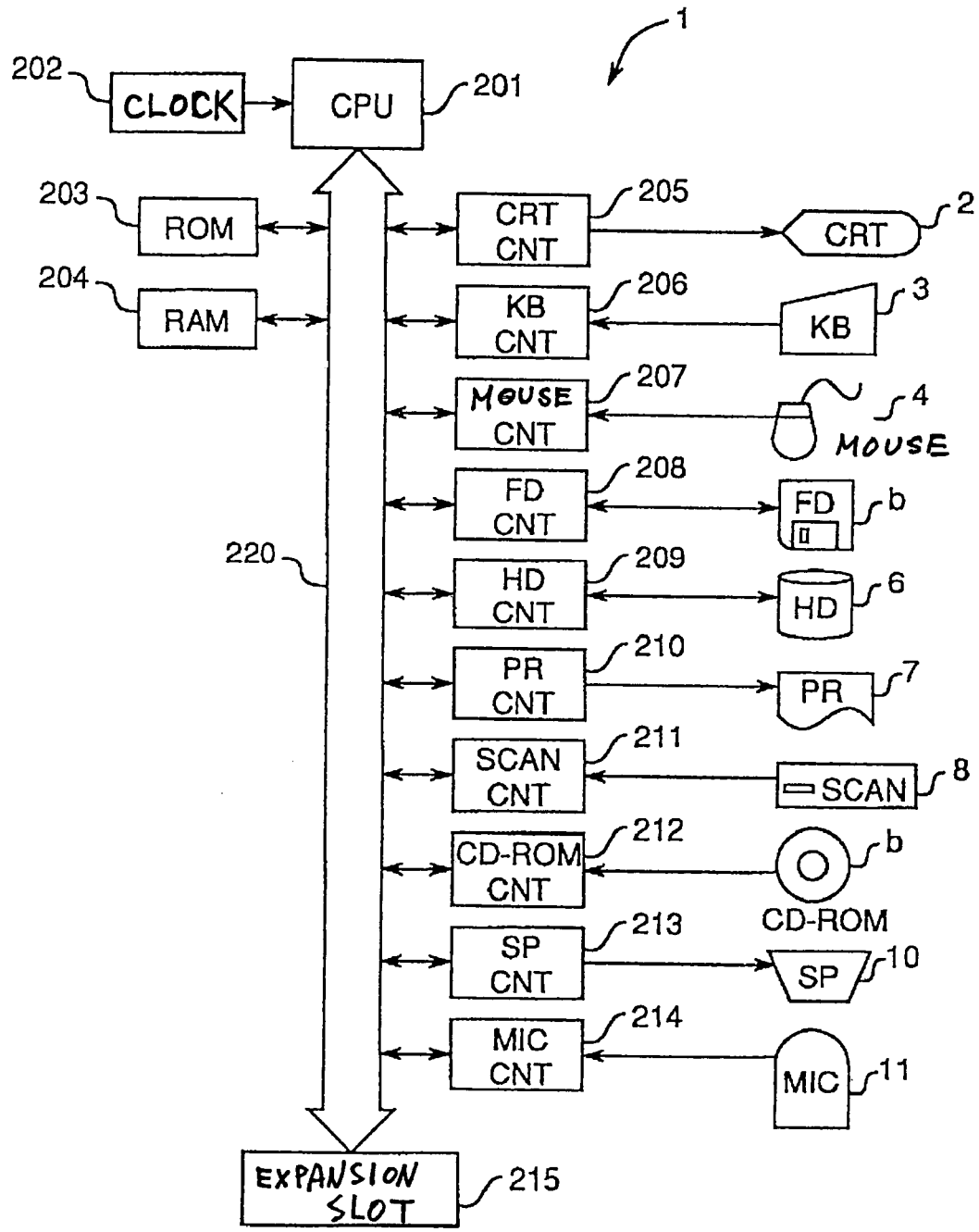
FIG. 2 is a block diagram of the image processing apparatus.

FIG. 2 is a block diagram centered on a controller 1. The controller 1 has a CPU 201 at it center, and connected to this CPU 201 via a data bus 220 are a ROM 203 for storing various processing programs and the like, RAM 204 for storing programs and various data, display control circuit 205 for displaying image and text and the like on the display 2, keyboard control circuit 206 for controlling and transferring input from the keyboard, mouse control circuit 207 for controlling and transferring input from the mouse, floppy disk drive control circuit 208 for controlling the floppy disk drive, hard disk control circuit 209 for controlling the hard disk, printer control circuit 210 for controlling output to the printer 7, scanner control circuit 211 for controlling the scanner 8, CD-ROM drive control circuit 212 for controlling the CD-ROM drive, speaker control circuit 213 for controlling the speaker 10, and a microphone control circuit 214 for controlling the microphone 11. Furthermore, a clock circuit 202 supplies various types of clock signals necessary for the operation of the image processing apparatus. An expansion slot 215 is connected so as to allow connection of various types of expansion ports via the data bus.

Figure 3:
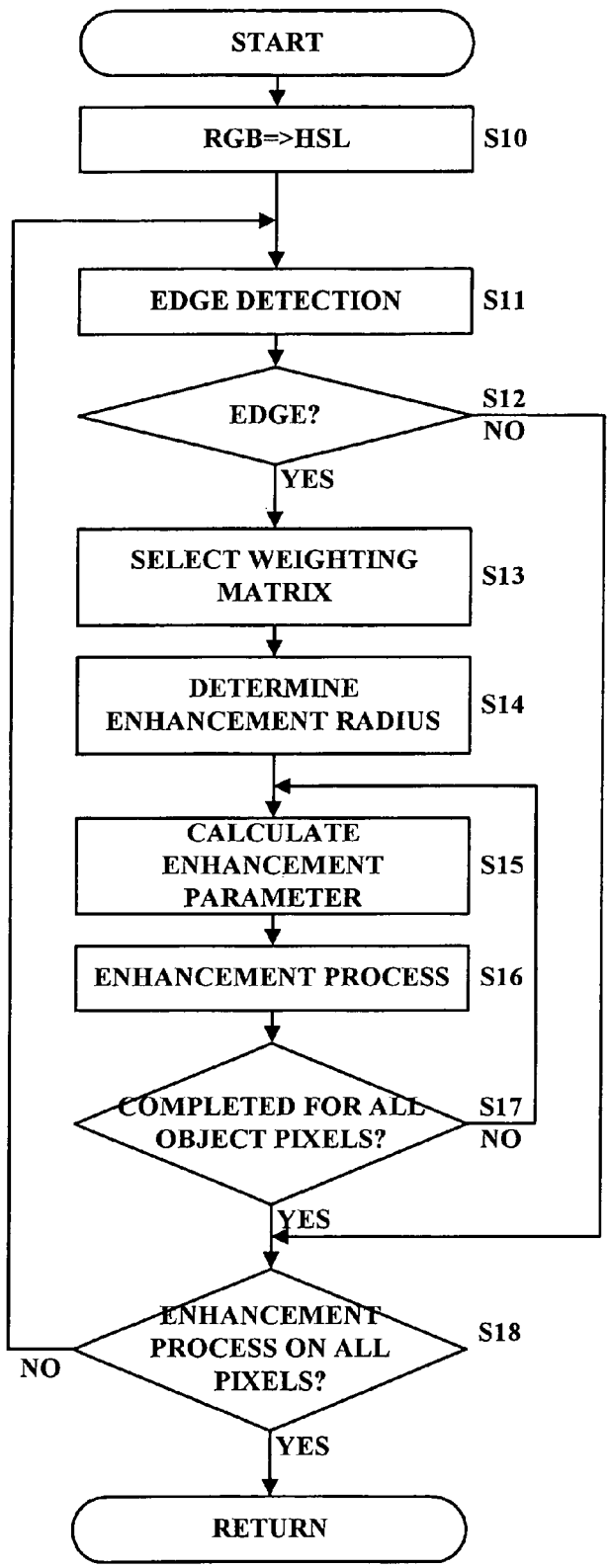
FIG. 3 is a flow chart of edge enhancement.

The controller 1 performs various types of image processing on a digital image. The digital image edge enhancement process is described below. FIG. 3 shows the flow of the edge enhancement process performed by the controller 1.

First, image data in the RGB color system are converted to image data in the HSL color system (step S10). Then, steps S11-S18 are steps of the edge enhancement process performed on the L component of the image data in the HSL color system of a specific target pixel, and these steps are repeated until the edge enhancement process has been performed on all pixels.

In step S11, a filtering process is executed to detect the edge. Specifically, a 3×3 pixel block comprising a target pixel and the surrounding pixels is extracted, and the block is filtered. The coordinates within this block are defined as shown in FIG. 4. The pixel at coordinates (2,2) is the target pixel. The edge detecting matrices w1 used in this filtering is shown in FIGS. 5A through 5D. For example, FIG. 5A is a filter for detecting an edge present above the target pixel, and the edge is detected by comparing the value of θ1a determined by equation (1) below to a specific threshold value.

$$\theta 1a = \left| \sum_{i=1,j=1}^{i=2,j=3} X_{ij} w1_{ij} \right| \quad (1)$$

Where $X_{ij}$ represents the value of L at coordinates (i,j), and $w1_{ij}$ represents line i column j component of the edge detecting matrix w1.

Similarly, FIG. 5B is an edge detecting matrix for detecting an edge present below a target pixel, and the edge is detected by comparing the value of θ1b determined by equation (2) below to a specific threshold value.

$$\theta 1b = \left| \sum_{i=2,j=1}^{i=3,j=3} X_{ij} w1_{ij} \right| \quad (2)$$

Similarly, FIG. 5C is an edge detecting matrix for detecting an edge present to the left of a target pixel, and the edge is detected by comparing the value of θ1c determined by equation (3) below to a specific threshold value.

$$\theta 1c = \left| \sum_{i=1,j=1}^{i=3,j=2} X_{ij} w1_{ij} \right| \quad (3)$$

Similarly, FIG. 5D is an edge detecting matrix for detecting an edge present to the right of a target pixel, and the edge is detected by comparing the value of θ1d determined by equation (4) below to a specific threshold value.

$$\theta 1d = \left| \sum_{i=1,j=2}^{i=3,j=3} X_{ij} w1_{ij} \right| \quad (4)$$

In the present embodiment, the edge between pixels is determined as described above. In this way edges are naturally enhanced without enhancing only lines by increasing the difference between both pixels circumscribing the edge during enhancement. Furthermore, edges present around a target pixel can be limited to four types by determining the edge between pixels, and subsequent selection of weighting matrix is simply accomplished.

Figure 7:
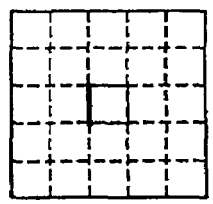
FIG. 7 shows the target pixel and the edge position.
Figure 8:
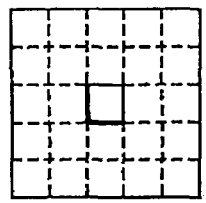
FIG. 8 shows the target pixel and the edge position.
Figure 9:
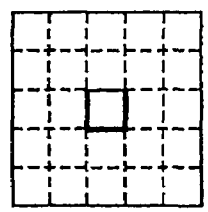
FIG. 9 shows the target pixel and the edge position.
Figure 10:
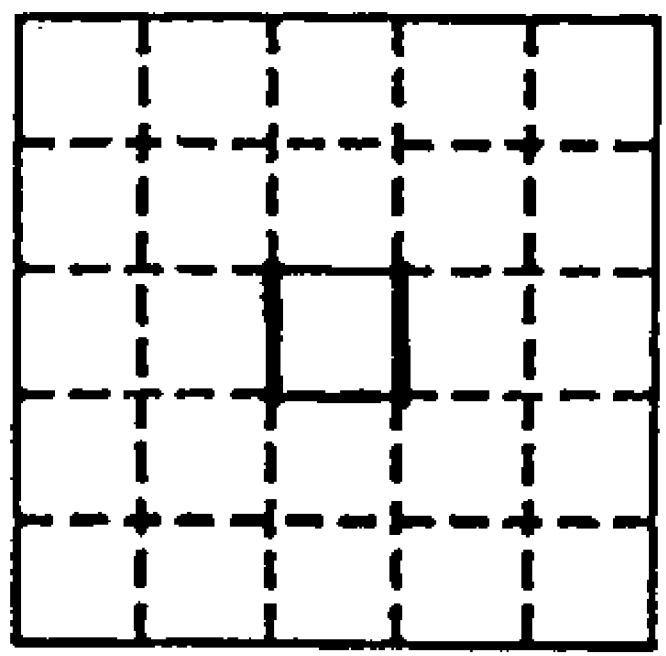
FIG. 10 shows the target pixel and the edge position.

When an edge is detected at a target pixel (step S12: YES), the weighting matrix w2 is selected to determine the enhancement radius R (step S13). Then, a block of 5×5 pixels comprising the target pixel and 24 surrounding pixels is extracted, the selected weighting matrix w2 is used for filtering this block, and the enhancement radius R is determined (step S14). The coordinates within this block are defined as shown in FIG. 11. FIGS. 12A through 12D show examples of the weighting matrices w2. FIG. 12A shows a weighting matrix w2 when an edge is detected at the left side of the target pixel (FIG. 7), FIG. 12B shows a weighting matrix w2 when edges are detected below and on the left side of the target pixel (FIG. 8), FIG. 12C shows a weighting matrix w2 when edges are detected below, on the left side and on the right side of the target pixel (FIG. 9), and FIG. 12D shows a weighting matrix w2 when an edge is detected on the left and right sides of the target pixel (FIG. 10). In all weighting matrices w2, pixels from a11 to a55 are not 0.

Figure 6:
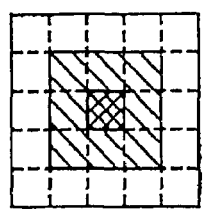
FIG. 6 shows one example of an enhanced pixel.

The edge enhancement radius R is a parameter representing the range for enhancing the edge, and is used to determine to which pixel to perform enhancement at the peripheral pixels considered as the edge. For example, the enhancement radius is 1 (pixel) in the example of FIG. 6, and the target pixel and surrounding pixels (shaded area) represent the enhanced pixels obtained by edge enhancement.

Specifically, the enhancement radius R is automatically calculated in accordance with equation (5) below from the image data and weighting matrix w2 using the radius calculation function F(x).

$$R=F(\Sigma x_{ij} w2_{ij}) \quad (5)$$

Where $x_{ij}$ represents the value of L at coordinates (i,j), and $w2_{ij}$ represents the line i column j component of the weighting matrix w2.

The radius calculation function F(x) is a function such as shown in the examples below.

$$F(x)=1 \text{ when } b1 \leq x < b2$$

$$F(x)=2 \text{ when } b2 \leq x < b3$$

Where b1 and b2 are constants.

The edge enhancement range (enhancement radius) should be determined from the slope (gradation) of the luminance of the edge periphery and edge line type (thickness). The edge enhancement radius is closely related to the edge width. When the edge enhancement radius is small, the edge width is thin, and when the edge enhancement radius is large, the edge width is thick. The edge thickness must be adjusted depending on the object. The weighting in the weighting matrix w2 is at the opposite side (edge inner side) of the edge position relative to the target pixel. Since the edge enhancement radius is determined using the weighting matrix w2, the determined edge enhancement radius is related to the edge width if an edge is in the periphery of the target pixel. When the object is a building, there is a slope point (edge) of acute change in luminance near the object edge, and when the object is a human image, and particularly the photograph of a face, the change in luminance is smooth near the edge. These characteristics are reflected in the edge enhancement radius.

Then, pixels within the enhancement radius R, i.e., the object pixels for edge enhancement processing, are subjected to the enhancement process using the enhancement parameters. Moreover, characteristics of the object can be reflected since the enhancement parameters are determined from the color information and chroma information near the edge. First, the enhancement parameter is calculated for the value L(i,j) of the image data of one object pixel (step S15), and the enhancement process is executed (step S16). This enhancement process is repeated until processing is completed for all object pixels within the enhancement radius R (step S17: YES).

A first enhancement coefficient P1 and a second enhancement coefficient P2 are included in the enhancement parameters, and are calculated from the color information and the enhancement radius as described below.

The first enhancement coefficient P1 is determined from the color information and chroma of the surroundings, i.e., from image data of the target pixel and the eight surrounding pixels. As shown in Table 1, four types of color (neutral color, flesh color, warm color, other) are discriminated to determine the first enhancement coefficient P1.

TABLE 1

| Color | P1 | Reason |
|---|---|---|
| Neutral color | 0.6 | Enhance text edge |
| Flesh color | 0.7 | Produce skin texture |
| Warm color | 0.7 | Soft tones are unnatural with hard edges |
| Other | 1.0 | |

The second enhancement coefficient P2 is determined by the distance from the center pixel of the enhancement. As shown in Table 2, the second enhancement coefficient P2 is calculated for distances 0, 1, 2 (pixels).

TABLE 2

| Distance | P2 |
|---|---|
| 0 | 1.0 |
| 1 | 0.8 |
| 2 | 0.6 |

Figure 13:
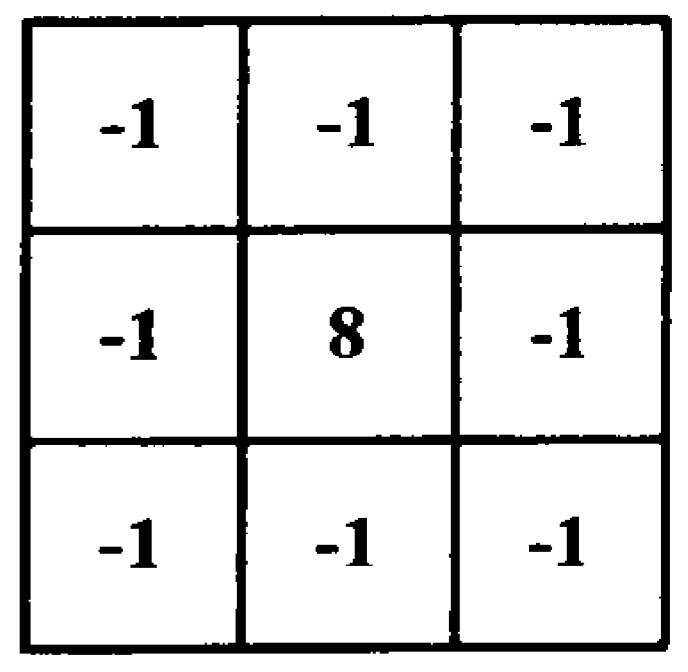

The corrected image data L'(i,j) are calculated by equation (6) below using the uncorrected image data L(i,j), the two enhancement coefficients P1 and P2, and the edge enhancement matrix w3 shown in FIG. 13.

$$L'(i,j)=L(i,j)+W*P1*P2 \quad (6)$$

$$W=\Sigma L(i,j)*w3ij \quad (7)$$

Where $w3ij$ represents the line i column j component of the edge enhancement matrix w3.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing apparatus, comprising:
   edge detecting means for determining the presence/absence of an edge between a target pixel and pixels nearest to said target pixel of input data and detecting a position of the edge of each target pixel;
   selecting means for selecting a weighting matrix corresponding to the position of the edge of each target pixel determined to have an edge by said edge detecting means;
   enhancement range determining means for determining, using said weighting matrix, a range of edge enhancement of each said target pixel determined to have an edge; and
   edge enhancing means for executing an edge enhancement process on data of object pixels within the enhancement range determined by said enhancement range determining means.

2. An image processing apparatus according to claim 1, wherein said enhancement range determining means increases the weighting of components corresponding to the interior side of the edge in the weighting matrix.

3. An image processing apparatus according to claim 1, wherein said edge detecting means determines the edge to be between pixels.

4. An image processing apparatus according to claim 1, wherein said selecting means selects the weighting matrix based on the presence/absence of an edge in four directions surrounding the target pixel.

5. An image processing apparatus according to claim 1, wherein said edge enhancing means executes processing based on the hue and chroma of the pixels surrounding the object pixel.

6. An image processing apparatus according to claim 1, wherein said edge enhancing means executes processing based on the distance of the object pixel to the target pixel.

7. An image processing method, comprising the steps of:
determining the presence/absence of an edge between a target pixel and pixels nearest to said target pixel of input image data;
detecting a position of the edge of each target pixel;
selecting a weighting matrix corresponding to the position of the edge for each target pixel determined to have an edge, said position being between a target pixel and pixels nearest to said target pixel;
determining, using said weighting matrix, a range of edge enhancement for each said target pixel determined to have an edge; and
executing an edge enhancement process for the object pixels within the determined edge enhancement range.

8. An image processing method according to claim 7, wherein the weighting of components corresponding to the interior side of the edge in the weighting matrix is increased in the step of determining the range.

9. A computer readable medium storing a computer program comprising the steps of:
determining the presence/absence of an edge between a target pixel and pixels nearest to said target pixel of input image data;
detecting a position of the edge of each target pixel;
selecting a weighting matrix corresponding to the position of the edge for each target pixel determined to have an edge;
determining, using said weighting matrix, a range of edge enhancement for each said target pixel determined to have an edge; and
executing an edge enhancement process for the object pixels within the determined edge enhancement range.

10. An image processing apparatus, comprising:
an edge detector for determining the presence/absence of an edge between a target pixel and pixels nearest to said target pixel of input data and detecting a position of the edge of each target pixel;
a selector for selecting a weighting matrix corresponding to the position of the edge of each target pixel determined to have an edge by said edge detecting means; and
a controller configured to determine, using said weighting matrix, the range of edge enhancement of each said target pixel determined to have an edge;
said controller further configured to execute an edge enhancement process on data of object pixels within the enhancement range determined by said enhancement range determining means.

* * * * *